H. G. WESTMORE.
UPHOLSTERING ATTACHMENT.
APPLICATION FILED AUG. 3, 1907.
931,106.
Patented Aug. 17, 1909.
2 SHEETS—SHEET 1.
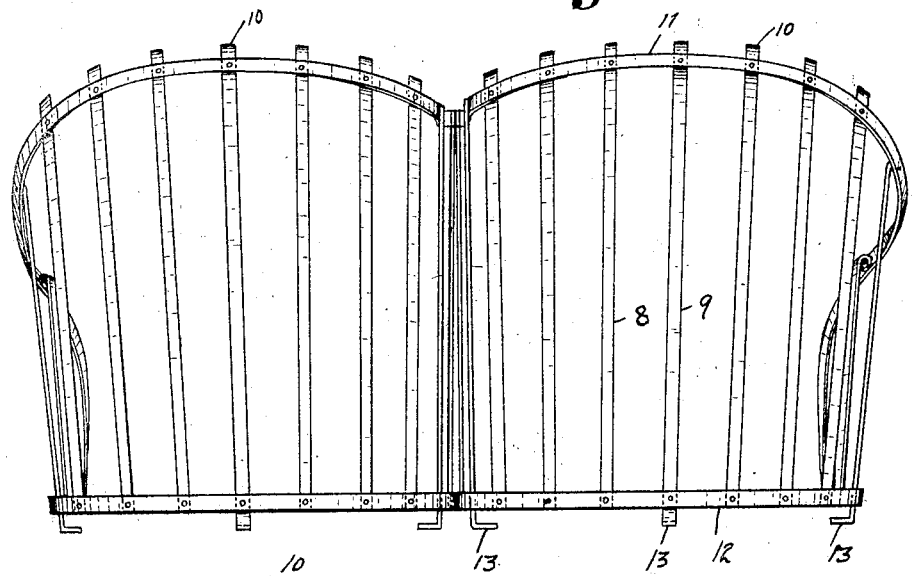
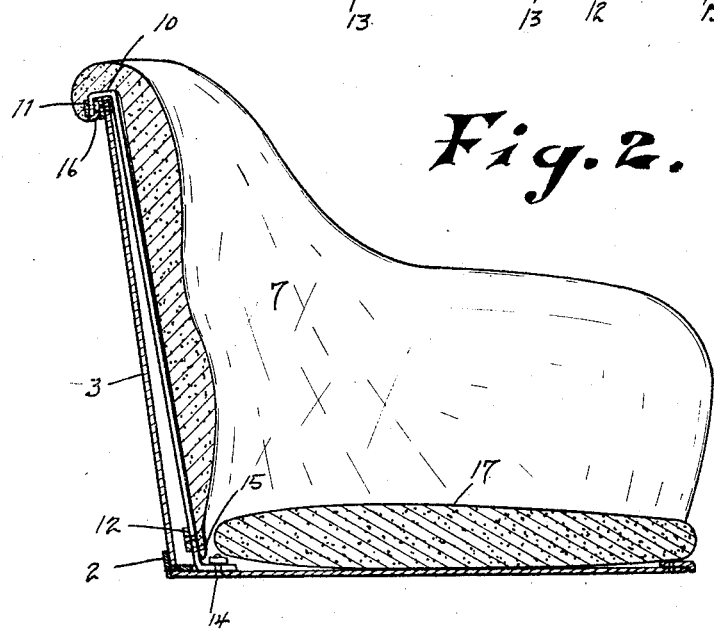
Witnesses
C. R. Erwin
M. M. Schultz
Inventor
Halward G. Westmore
By Erwin & Wheeler
Attorneys

H. G. WESTMORE.
UPHOLSTERING ATTACHMENT.
APPLICATION FILED AUG. 3, 1907.

931,106.

Patented Aug. 17, 1909.
2 SHEETS—SHEET 2.

Witnesses
O. R. Erwin
A. A. Schulz

Inventor
Halward G. Westmore

By Erwin G. Wheeler
Attorneys

UNITED STATES PATENT OFFICE.

HALWARD G. WESTMORE, OF MILWAUKEE, WISCONSIN, ASSIGNOR TO A. O. SMITH COMPANY, OF MILWAUKEE, WISCONSIN, A CORPORATION OF WISCONSIN.

UPHOLSTERING ATTACHMENT.

No. 931,103.   Specification of Letters Patent.   Patented Aug. 17, 1909.

Application filed August 3, 1907. Serial No. 386,872.

*To all whom it may concern:*

Be it known that I, HALWARD G. WESTMORE, a citizen of the United States, residing at Milwaukee, county of Milwaukee, and State of Wisconsin, have invented new and useful Improvements in Upholstering Attachments, of which the following is a specification.

My invention relates to improvements in upholstering attachments for automobile seats.

The object of my invention is to provide a form of construction in which the upholstery may be applied and rigidly secured in position after the metal body of the seat has been enameled or otherwise finished, the upholstery, however, being removable for repairs, or when it is desired to clean the seat, and the shape of the upholstery cushions being maintained by means of a skeleton metallic frame which also serves as a connecting means. This skeleton frame is hooked over the back of the seat and the frame is connected at its base with the bottom of the seat by down-drawing fastenings, the frame being so proportioned that the hooked upper margin is caused to bind upon the edge of the permanent back or metal body.

Figure 3:
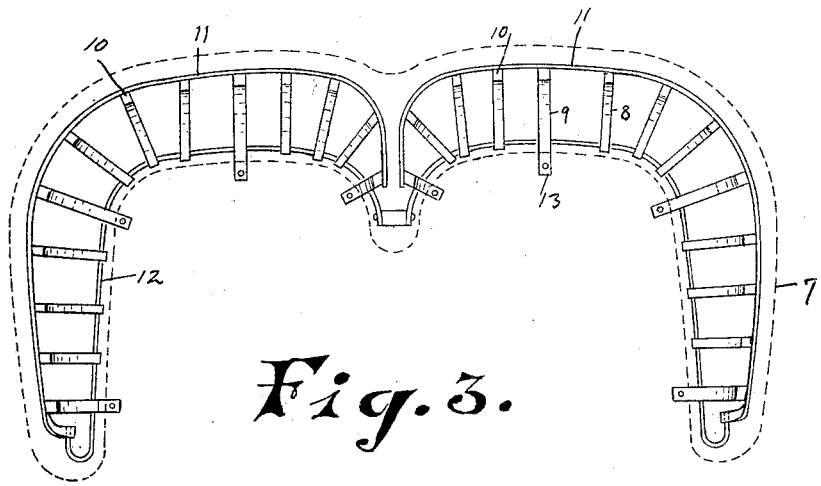
Figure 4:
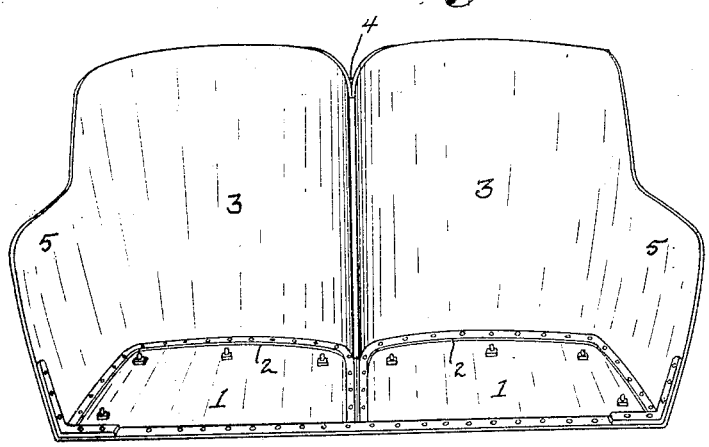

In the following description reference is had to the accompanying drawings, in which, Figure 1 is a rear view of the upholstery frame. Fig. 2 is a vertical sectional view of the seat with the upholstery cushions in position. Fig. 3 is a plan view of the frame, with dotted lines indicating the outline of the upholstery when adjusted thereto. Fig. 4 is a perspective view of the metallic body of the seat as it appears when the upholstery is removed.

Like parts are identified by the same reference characters throughout the several views.

The drawings show a form of double seat in common use for automobiles, the seat bottom 1 and the members 3 of the back, together with the side arms 5, being formed of sheet metal. The members 3 of the back curve forwardly and are connected at 4, either integrally or by any other suitable means, and the bottom of the seat is reinforced by bars 2.

The upholstery 7 is secured to an open skeleton frame comprising a series of bars 8 and 9, adapted, when in position of use, to extend upwardly along the inner surface of the members 3 and side arms 4, and having their upper ends bent in the form of L-shaped hooks 10 which engage over the upper margins of the members 3 and 5, with their upper extremities connected by a bar 11 conforming in general contour with the contour of the seat back and its side arms. The lower end portions of the bars are connected by a base bar 12, which conforms generally in contour with that of the rear and side margins of the bottom, and the lower ends of the bars 9 extend below the base bar 12 and are elbowed to form feet 13, which extend along the bottom 1, to which they are secured by means of bolts or other suitable fastenings 14. The construction is such that when the bolts 14 are tightened, the hook portions 10 of the frame are caused to bind on the upper margins of the members 3 and 5, which prevents the parts from rattling. The hook portions 10 are drawn downwardly upon the upper edge of the seat back by the fastenings 14 and thus prevented from lifting therefrom when subjected to the jolts or vibrations of the vehicle, and the upholstery frame may therefore be held in position with the same rigidity as if it constituted a permanent portion of the seat. The end portions of the bar 11 are bent downwardly along the front margins of the members 5 and the bar 12 has its ends looped around the margins of these members and connected with the extremities of the bar 11 near the base. The upholstery 7 is secured to the frame near its lower margin by means of rivets 15 or other suitable fastenings. The covering for the upholstery is extended over the upper portion of the frame and around the upper bar 11, and the extremities of the hooks 10, and forms an inner lining 16 for these hooks, whereby the metal portions of the skeleton frame are kept out of contact with the upper margins of the parts 3. The seat cushion 17 is of any ordinary construction and is preferably arranged to cover the fastenings 14.

It will be observed that the hooks 10 and connecting bar 11, when covered by the upholstery, form a continuous channel for the reception of the upper margin of the back and side arms of the seat, the upholstery frame being prevented from lifting by the feet 13 on the bars 9, which are secured to the seat bottom. When the skeleton frame is in position, it is entirely concealed by the upholstery and by the permanent back of the seat. It will also be observed that the bars 8 and 9 diverge from the back of the seat from the upper edge thereof downwardly. The bars are preferably formed of resilient material, thus adding elasticity to the upholstery cushions.

Having thus described my invention what I claim as new and desire to secure by Letters Patent is:

1. In a vehicle seat, the combination with the seat back, of a removable frame conforming generally to the contour of the inner surface of the back and arranged to hook over its upper margin, detachable down-drawing fastenings rigidly connecting the lower portion of the seat, the frame being so proportioned to the seat back, that the hooked portion of the frame is drawn into binding engagement with the upper margin of the back by said fastenings, said frame having no rigid intermediate connection with the seat back.

2. In a vehicle seat, the combination with the seat back, of a removable frame, conforming generally to the contour of the inner surface of the back and comprising a series of upwardly extending bars provided with hooked upper end portions offset rearwardly, connecting bars at the extremities of the upwardly extending bars, some of said upwardly extending bars being provided with elbowed lower ends, a body of upholstery mounted on said frame, and fastenings detachably connecting the frame with the bottom of the seat.

3. The combination with a seat having a permanent back, of a removable frame adapted to loosely engage the upper portion of the back of the seat, and down-drawing fastenings adapted to detachably connect the lower portion of the frame with the seat in a position to draw the upper portion into forcible engagement with said back of the seat, said frame being otherwise free to move vertically along the seat back.

4. In a vehicle seat the combination with the seat back and sides of a removable skeleton frame provided with a rearwardly offset upper margin forming a channel for the reception of the margin of the seat and its side arms, and having some of its frame bars extended at their lower ends and elbowed to form connecting feet, fastenings detachably connecting said feet with the seat bottom, a body of upholstery permanently mounted on the frame, in a position to conceal all portions of the same except the connecting feet, and a cushion for the seat bottom, covering said feet, and the fastenings therefor.

5. In a vehicle seat, the combination with the seat back, of a removable frame loosely hooked over the upper margin of the seat back, and having its lower margin detachably connected with the seat on the inner side thereof, and a body of upholstery adjusted over the inner surface and hooked upper margin of the frame and concealing the same from view, the covering of said upholstery being extended around the hooked upper margin and interposed between the frame and the back of the seat along its upper edge.

6. The combination with a vehicle seat, provided with a permanent back, of a removable frame adjusted to the inner face of the back without fixed connection therewith except at its upper and lower margins, said frame being formed to loosely engage the seat near one margin, tension fastenings near the other margin of the frame adapted to detachably connect the frame with the seat and arranged to draw the frame with binding pressure upon the seat at the first mentioned point of engagement, whereby the frame is rigidly and removably held in position, and a body of upholstery secured to the frame.

7. In a vehicle seat, the combination with the seat back, of a removable frame conforming generally to the contour of the inner surface of the back and arranged to hook over its upper margin, fastenings detachably and rigidly connecting the lower portion of the frame with the seat, and a body of upholstery permanently mounted on said frame, said frame being resilient and arranged to extend downwardly and divergently from the upper margin of the seat back whereby the intermediate portion of the frame is permitted to yield under pressure.

In testimony whereof I affix my signature in the presence of two witnesses.

HALWARD G. WESTMORE.

Witnesses:
C. S. SMITH,
LEVERETT C. WHEELER.